US006530436B2

(12) United States Patent
Nowak, Jr. et al.

(10) Patent No.: US 6,530,436 B2
(45) Date of Patent: Mar. 11, 2003

(54) PNEUMATIC TOOL WITH MUFFLER BYPASS MECHANISM

(75) Inventors: Dennis A. Nowak, Jr., Greendale, WI (US); Jose R. Bachman, Franklin, MA (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 98 days.

(21) Appl. No.: 09/821,253

(22) Filed: Mar. 29, 2001

(65) Prior Publication Data

US 2002/0139547 A1 Oct. 3, 2002

(51) Int. Cl.[7] .................................................. B23B 45/04

(52) U.S. Cl. .................. 173/168; 173/169; 173/DIG. 2

(58) Field of Search ................................ 173/168, 169, 173/DIG. 2, 219

(56) References Cited

U.S. PATENT DOCUMENTS 2,643,731 A * 6/1953 Schmid ...................... 181/230
2,830,560 A * 4/1958 Doeden ...................... 173/59
3,270,834 A * 9/1966 Bratt .......................... 181/230
3,554,316 A * 1/1971 Judd et al. .................. 181/230
3,635,299 A * 1/1972 Hayes ........................ 181/230
3,809,179 A * 5/1974 Delaney et al. ............. 181/230
3,891,049 A * 6/1975 Stroezel et al. ............. 181/230
3,993,159 A 11/1976 Amador
4,057,113 A 11/1977 Paule et al.
4,135,602 A * 1/1979 Clark ......................... 181/230
4,161,996 A 7/1979 Dolejsi
4,189,917 A * 2/1980 Gunning ...................... 60/370
4,303,131 A * 12/1981 Clark ......................... 173/207
4,346,783 A 8/1982 Scarton et al.
4,404,799 A 9/1983 Dudek
4,479,553 A 10/1984 Virgili
4,962,787 A 10/1990 Mayhew
5,244,521 A * 9/1993 Ligman ....................... 156/85
5,489,753 A 2/1996 Gibel
5,581,055 A * 12/1996 Self et al. ................... 181/230
5,591,070 A 1/1997 Kachich
5,901,794 A 5/1999 Schoeps et al.
5,927,584 A 7/1999 Akiba
5,992,539 A 11/1999 Lin

* cited by examiner

*Primary Examiner*—Scott A. Smith
*Assistant Examiner*—Nathaniel Chukwurah
(74) *Attorney, Agent, or Firm*—Seyfarth Shaw

(57) ABSTRACT

A pneumatic tool has a housing with an external surface and defining a plurality of cavities therein to hold components of the pneumatic tool. The housing defines a motor cavity wherein a pneumatic motor is disposed. Two spaced-apart vents extend from the motor cavity to the external surface of the housing, and a muffler is mounted adjacent to one vent. A tubular sleeve, which includes a radially extended discharge portion from which exhaust may escape, is mounted on the external surface of the housing and cooperates with it to define an annular exhaust passageway. The sleeve is rotatable between muffled and unmuffled positions wherein the discharge portion is respectively adjacent to the one vent or the other.

18 Claims, 4 Drawing Sheets

PNEUMATIC TOOL WITH MUFFLER BYPASS MECHANISM

BACKGROUND

This application relates generally to a pneumatic tool. More particularly, this application relates to a pneumatic tool which can be selectively operated in either a muffled mode or an unmuffled mode.

Pneumatic tools are driven by pneumatic motors which rely on the flow of compressed gas through vanes in order to provide power. Once compressed gas has been utilized by the motor, it must be exhausted from the motor and the tool so that a constant flow of gas can be maintained.

Typically, the velocity of the exhaust gas is quite high, generating a loud noise as it leaves the pneumatic tool. In order to reduce the noise, muffler mechanisms have been developed to reduce the velocity of the compressed gas as it escapes from the pneumatic tool. By slowing the velocity of the compressed gas, the noise level is reduced.

Reducing the velocity of the compressed gas is typically achieved by inserting muffler material along the exhaust path for the compressed gas. The muffler material provides resistance to the flow of compressed gas, thereby reducing its velocity and reducing the noise generated. However, by inserting muffler material within the flow path of the compressed gas, back pressure is created which reduces the flow of gas through the motor, reducing the power of the pneumatic tool.

Consequently, a typical pneumatic tool will offer its user either high power with high noise level in an unmuffled exhaust system, or reduced noise but reduced power in a muffled exhaust system.

SUMMARY

Therefore, it is a general object of this application to provide a pneumatic powered tool that avoids the disadvantages of prior designs while affording additional structural and operating advantages.

An important feature is the provision of a pneumatic tool which is capable of working in either a muffled mode of operation or a higher power, unmuffled mode of operation.

Another important feature is the provision of a pneumatic tool which is easily switchable between a muffled mode of operation or an unmuffled mode of operation.

BRIEF DESCRIPTION OF THE DRAWINGS

For purposes of facilitating and understanding the subject matter sought to be protected, there is illustrated in the accompanying drawings an embodiment thereof, from an inspection of which, when considered in connection with the following description, the subject matter sought to be protected, its construction and operation, and many of its advantages should be readily understood and appropriated.

DETAILED DESCRIPTION

Figure 1:
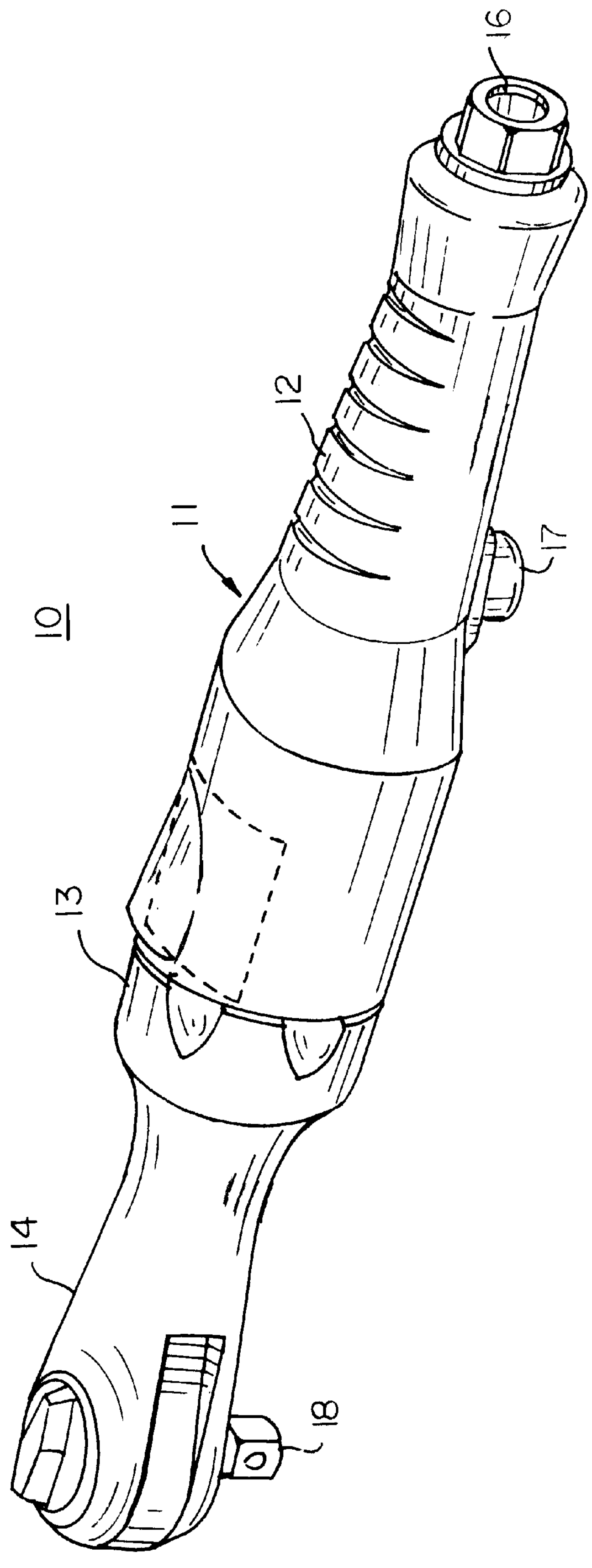
FIG. 1 is a perspective view of an embodiment of the pneumatic power tool.

Referring to FIG. 1, an embodiment of a pneumatic tool 10 is illustrated. For the purposes of illustration only, this embodiment of the pneumatic tool 10 is configured as an air ratchet. A pneumatic tool in accordance with the principals of this application can be otherwise configured to perform other functions.

The pneumatic tool 10 includes a housing 11 which encloses a majority of the pneumatic tool 10. The housing 11 comprises a grip portion 12, a cylindrical middle portion 13 and a head portion 14. An air inlet 16 extends longitudinally from the grip portion for receiving a pneumatic tube. A control button 17 depends from the grip portion 12 to control the flow of compressed air into the pneumatic tool 10. A drive square 18 depends from the head portion 14, the drive square being attachable to a tool in order to perform work in a known manner.

Referring to FIGS. 2, 3, 4 and 5, the housing 11 has an external surface 20 and defines a plurality of cavities therein to hold components of the pneumatic tool 10. Within the cylindrical middle portion 13 of the housing 11, a motor cavity 21 is defined. The cavity 21 is sized to accept a pneumatic motor 22 therein. Bosses or other protuberances may extend from the internal surface 19 of the housing 11 to prevent displacement of the pneumatic motor 22 and to maintain it in a specific orientation.

A first vent 23 extends from the motor cavity 21 to the external surface of the housing. The first vent 23 is preferably positioned to align with exhaust ports 25 of the motor providing a direct pathway for the escape of exhaust. A second vent 24 can be positioned diametrically opposite the first vent 23, to also extend from the motor cavity 21 to the external surface of the housing. The first and second vents 23,24 can each be comprised of one or a plurality of apertures.

Figure 2:
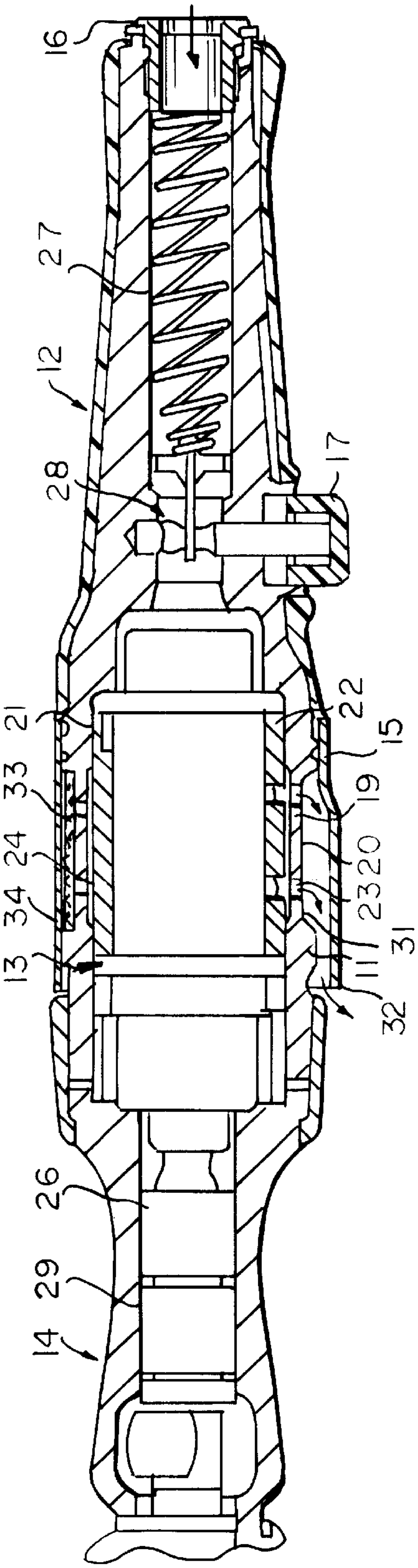
FIG. 2 is a sectional view of the pneumatic tool of FIG. 1 in an unmuffled configuration.

Referring to FIG. 2, the grip portion 12 of the housing 11 defines a gas passageway 27 extending longitudinally from the air inlet 16 to the motor cavity 21. A pneumatic tube (not shown) typically attaches to the air inlet 16 and communicates with the gas passageway 27. A valve mechanism 28 is positioned between the gas passageway 27 and the motor cavity 21 to regulate the flow of gas therebetween. The valve mechanism 28 is operated by the control button 17.

The head portion 14 of the housing 11 defines a drive cavity 29 extending longitudinally from the motor cavity 21. A drive shaft 26 is disposed within the drive cavity and couples to the pneumatic motor 22. The drive shaft 26 also couples to the drive square 18 (FIG. 1), and drives the rotational movement thereof.

Figure 5:
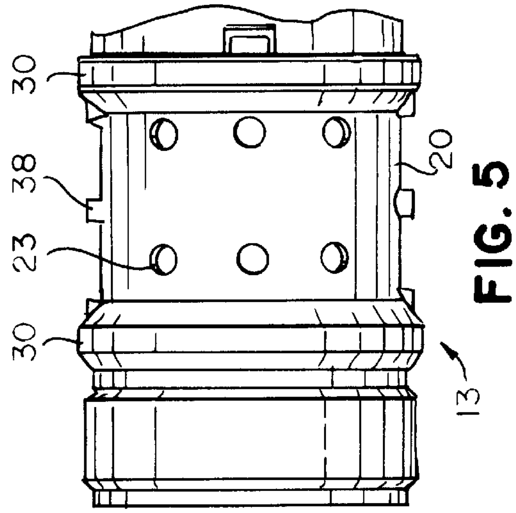
FIG. 5 is an enlarged, bottom plan view of the middle portion in FIG. 4, revealing a vent.
Figure 4:
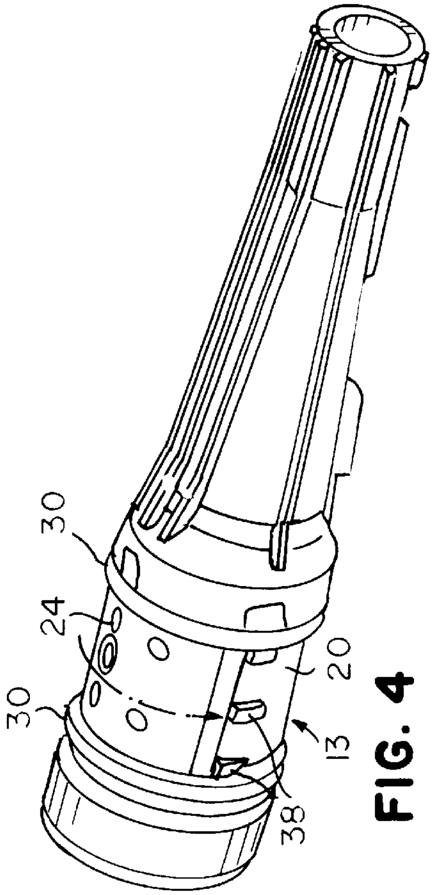
FIG. 4 is a perspective view of middle and grip portions of the housing of the pneumatic tool of FIG. 1.

Referring to FIGS. 4 and 5, a pair of ridges 30 can extend circumferentially around the external surface 20 of the middle portion 13. The ridges 30 are preferably parallel to each other, and are positioned to have the first and second vents 23 and 24 therebetween.

Referring to FIGS. 2, 3, 6, 7, and 8, an exhaust guide is disposed on the external surface 20 of the middle portion 13 to direct the exhaust flow emanating from the first and second vents 23, 24. The exhaust guide can include a tubular sleeve 15 rotatably and sealingly mounted on the ridges 30. The sleeve 15 and the ridges 30 define a generally sealed external exhaust passageway 31 which guides the flow of exhaust along the external surface of the middle portion 13. The tubular sleeve 15 can include a radially extended discharge portion 32 which is not engaged with a ridge 30, and from which exhaust may escape. The sleeve 15 can be rotatable relative to the ridges 30 between two positions, one in which the radially extended portion 32 is positioned over the first vent 23, and other in which the radially extended portion 32 is positioned over the second vent 24.

Figure 3:
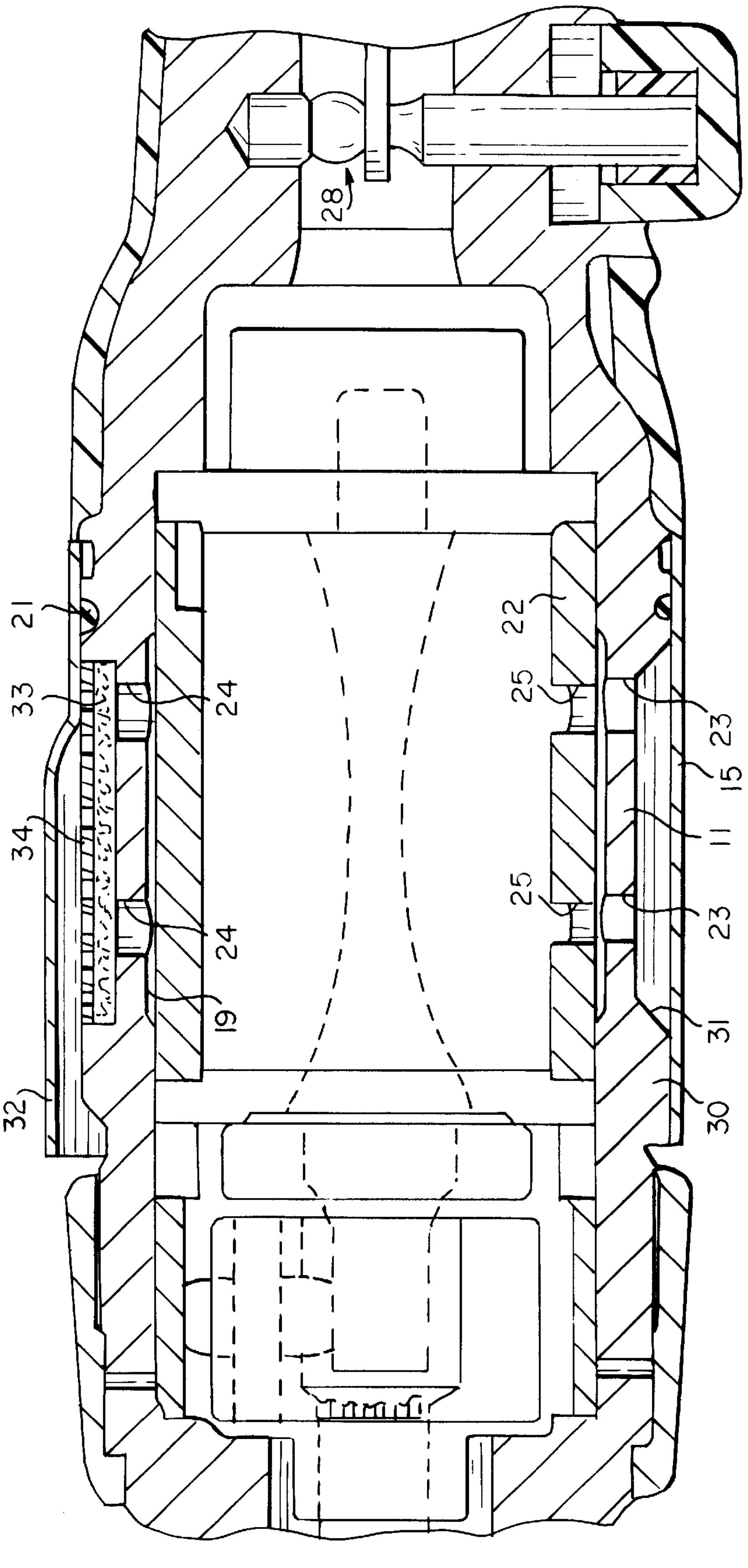
FIG. 3 is an enlarged, fragmentary sectional view of the bypass mechanism of the pneumatic tool of FIG. 1, with the tool in a muffled configuration.
Figure 9:
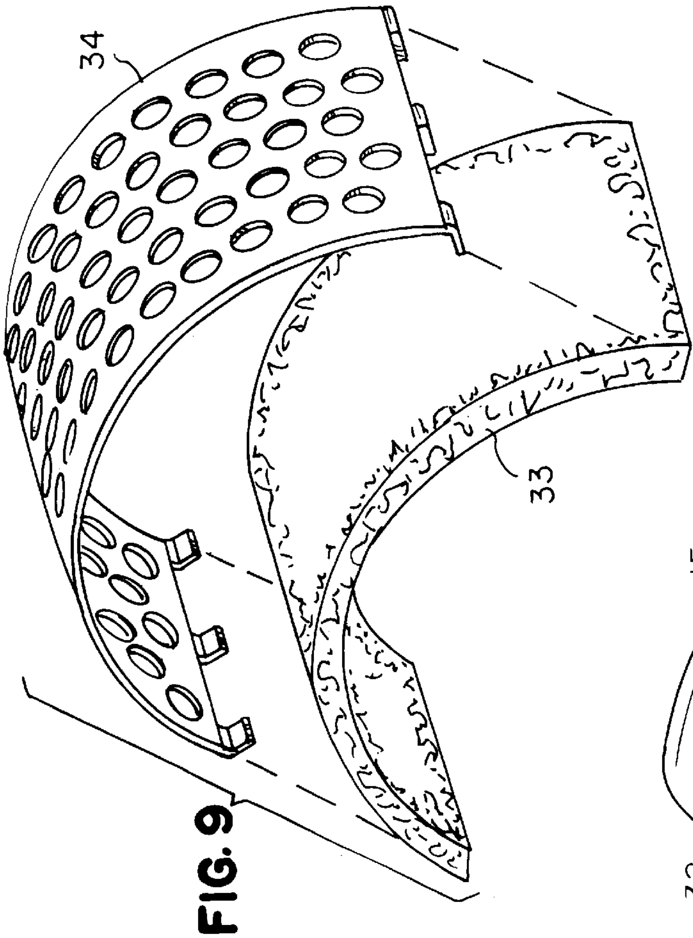
FIG. 9 is an enlarged, exploded view of the muffler assembly of the tool of FIG. 2.
Figure 8:
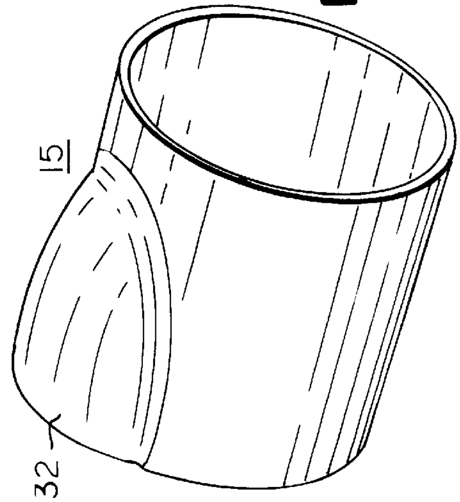
FIG. 8 is a perspective view of the sleeve of FIG. 6.
Figure 7:
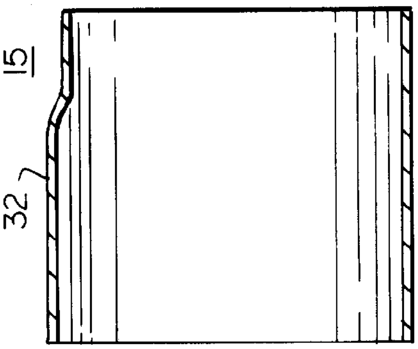
FIG. 7 is a cross-sectional view of the sleeve of FIG. 6 taken along lines 7—7 therein.
Figure 6:
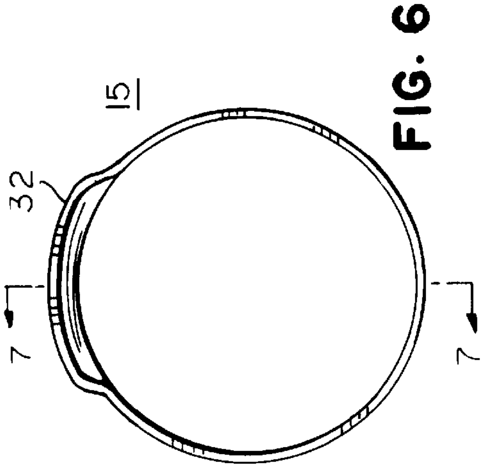
FIG. 6 is an enlarged front elevational view of a sleeve of FIG. 1.

Referring to FIGS. 2, 3 and 9, muffler material 33 may be placed on the external surface of middle portion 13 and within the external exhaust passageway 31, to reduce the noise created by the pneumatic tool 10. The muffler material 33 can be comprised of a polyurethane foam, but other known muffler materials can be used as well. A removable perforated retainer 34 can be included to retain the muffler material over the second vent 24. As shown in FIGS. 4 and 5, protuberances 38 may also extend from the external surface 20 of the housing 11 to prevent displacement of the muffler material 33.

Referring to FIG. 2, typically the pneumatic tool 10 is driven by compressed air that is delivered to the air inlet 16 by a pneumatic tube (not shown) coupled thereto. The compressed air enters the pneumatic tool from the air inlet 16 and is guided by the air passageway 27 to the valve mechanism 28 which controls pneumatic communication between the motor cavity 21 and the air passageway 27.

Depressing the control button 17 causes the valve mechanism 28 to open, allowing compressed air to enter the motor cavity 21 and the pneumatic motor 22. The influx of compressed air drives the vanes of the pneumatic motor 22 to rotate its rotor in a known manner, which in turn rotates the drive shaft 26 coupled to the pneumatic motor. Exhaust escapes the pneumatic motor 22 through the exhaust ports 25.

The first vent 23 is roughly aligned to the exhaust ports 25 on the pneumatic motor 22, so that a majority of the exhaust escaping from the exhaust ports 25 flow through the first vent 23 to the external surface 20 of the housing 11. A small portion of the exhaust may travel within the motor cavity 31 and escape through the second vent 24.

As shown in FIG. 2, the pneumatic tool can be operated in an unmuffled mode by rotating the sleeve 15 so that the radially extended portion 32 is positioned proximate to the first vent 23. By so positioning the radially extended portion 32, the majority of the exhaust from the pneumatic motor 22 follows a relatively unimpeded, unmuffled pathway to escape from the pneumatic tool 10. The exhaust simply leaves the exhaust port 25, flows through the first vent 23 and then escapes from the external surface 20 of the housing 11 by passing through the radially extended portion 32 of the sleeve 15. The minimal impedance faced by the exhaust prior to escape, reduces or eliminates any back pressure which would hinder the motor and reduce its power.

As is shown in FIG. 3, the pneumatic tool 10 can also be operated in a muffled mode by rotating the sleeve 15 so that the radially extended portion 32 is positioned above the muffler material 33. In this mode of operation, exhaust escapes from the first vent and most of it is guided by the sleeve to travel along the external surface 20 of the housing 11 and through the muffler material prior to escaping from the pneumatic tool. Some exhaust may also flow circumferentially around the motor 22 within the motor cavity 21 to the vent 24, and then through the muffler material 33. The muffler material 33 impedes the flow of exhaust and slows the velocity of the exhaust prior to escape from the pneumatic tool 10. The reduced velocity of the exhaust reduces the noise generated by the emission of exhaust from the pneumatic tool.

However, since the muffler material impedes the flow of exhaust from the pneumatic tool, back pressure develops within the pneumatic tool providing resistance to the flow of compressed gas into the pneumatic motor. Consequently, the pneumatic motor 22 operates at a reduced power level in the muffled mode of operation.

The radially extended portion 32 may also be placed in a continuum of positions between the first 25 and second 24 vents. These positions offer degrees of power level and noise suppression intermediate to those achieved in the muffled or unmuffled mode. Relatively higher power levels are achieved by positioning the radially extended portion 32 in closer proximity to the first vent 25, while relatively greater noise suppression is achieved by positioning the radially extended portion 32 in closer proximity to the second vent 24.

The matter set forth in the foregoing description and accompanying drawings is offered by way of illustration only and not as a limitation. While a particular embodiment has been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A pneumatic tool comprising:

a housing having an external surface and defining a motor cavity, and including first and second vents communicating with the motor cavity and extending through the housing to the external surface;

a pneumatic motor disposed within the motor cavity and having exhaust ports communicating with the cavity;

muffler material retained on the external surface of the housing overlying the second vent; and an exhaust guide disposed on the external surface of the housing and selectively positionable to define an unmuffled exhaust pathway or a muffled exhaust pathway between the exhaust guide and the external surface of the housing respectively from the first and second vents.

2. The pneumatic tool of claim 1 wherein the exhaust guide includes a generally tubular sleeve rotatably mounted on the external surface of the housing, the sleeve including a radially extended portion, the sleeve and the external surface of the housing defining an external exhaust passageway with the radially extended portion defining an exit therefrom.

3. The pneumatic tool of claim 2, wherein the first and second vents are in pneumatic communication with the external exhaust passageway.

4. The pneumatic tool of claim 3, wherein the tubular sleeve is rotatable between a first position wherein the radially extended portion is positioned over the second vent, defining the muffled exhaust pathway, and a second position wherein the radially extended portion is positioned over the first vent, defining the unmuffled exhaust pathway.

5. The pneumatic tool of claim 4, wherein the housing defines a cylindrical portion and includes a parallel pair of ridges extending circumferentially around the external surface of the cylindrical portion, the ridges engaging the sleeve and spacing it from the external surface to define the external exhaust passageway.

6. The pneumatic tool of claim 4, wherein the first and second vents each include a plurality of bores extending through the housing.

7. The pneumatic tool of claim 4, and further comprising a perforated retaining structure removably connected to the external surface of the housing to retain the muffler material over the second vent.

8. A pneumatic tool comprising:

a housing having an external surface and defining a motor cavity and including first and second vents communicating with the motor cavity and extending through the housing to the external surface;

a pneumatic motor disposed within the motor cavity and having exhaust ports communicating with the cavity;

muffler material retained on the external surface of the housing, overlying the second vent; and an exhaust guide including a generally tubular sleeve with a radially extended portion, the sleeve rotatably mounted on the external surface of the housing, and except for the radially extended portion, the sleeve and the external surface of the housing defining a generally sealed external exhaust passageway therebetween communicating with the first and second vents, the tubular sleeve being rotatable between a first position wherein the radially extended portion is positioned over the second vent, defining a muffled pathway for escape of exhaust, and a second position wherein the radially extended portion is positioned over the first vent, defining an unmuffled pathway for escape of exhaust.

9. The pneumatic tool of claim 8, wherein the first and second vents each include a plurality of bores extending through the housing.

10. The pneumatic tool of claim 8, wherein the housing defines a cylindrical portion and includes a parallel pair of ridges extending circumferentially around the external surface of the cylindrical portion, the ridges engaging the sleeve for spacing the sleeve from the external surface to define the external exhaust passageway.

11. The pneumatic tool of claim 8, and further comprising a perforated retaining structure removably connected to the external surface of the housing to retain the muffler material over the second vent.

12. A pneumatic tool comprising:

a housing defining an external surface and a motor cavity, and including first and second vents, each vent in pneumatic communication with the motor cavity and extending through the housing to the external surface;

a pneumatic motor disposed within the motor cavity;

muffler material retained on the external surface of the housing overlaying the second vent; and means for guiding exhaust flow along the external surface of the housing and movable between a first position, defining a muffled pathway for escape of exhaust, and a second position defining an unmuffled pathway for escape of exhaust.

13. The pneumatic tool of claim 12, wherein the means for guiding exhaust includes a generally tubular sleeve with a radially extended portion, the sleeve rotatably mounted on the external surface of the housing, except for the radially extended portion, the sleeve and the external surface defining a generally sealed external exhaust passageway with the radially extended portion defining an exit therefrom.

14. The pneumatic tool of claim 13, wherein the housing defines a cylindrical portion, and includes a parallel pair of ridges extending circumferentially around the external surface of the cylindrical portion, the ridges engaging the exhaust guide means to define an external exhaust passageway.

15. The pneumatic tool of claim 14, wherein the tubular sleeve is rotatable between a first position wherein the radially extended portion is positioned over the second vent, defining the muffled exhaust pathway, and a second position wherein the radially extended portion is positioned over the first vent, defining the unmuffled exhaust pathway.

16. A method of selectively bypassing a muffler along an external surface of a housing with an exhaust vent extending therethrough and spaced from the muffler, the method comprising:

mounting an exhaust guide in a selectively positionable, and sealing engagement to the external surface of the housing, the exhaust guide having a discharge portion for escape of exhaust and defining with the external surface an exhaust passageway providing communication between the exhaust vent and the muffler;

retaining muffler material on an external surface of the housing within the exhaust passageway; and selectively positioning the discharge portion of the exhaust guide in either a muffled position adjacent to the muffler material, or an unmuffled position adjacent to the vent.

17. The method of claim 16 wherein the exhaust guide includes a generally tubular sleeve rotatably mounted on the external surface of the housing, the discharge portion including a radially extended portion that extends above the external surface, the sleeve and the external surface of the housing defining the exhaust passageway.

18. A pneumatic tool comprising:

a housing having an external surface and defining a motor cavity, and including first and second vents communicating with the motor cavity and extending through the housing to the external surface, the external surface defining a cylindrical portion and having at least two parallel ridges extending circumferentially thereon;

a pneumatic motor disposed within the motor cavity and having exhaust ports communicating with the motor cavity;

muffler material retained on the external surface overlying the second vent; and an exhaust guide including a generally tubular sleeve having a radially extended portion and rotatably engaging the ridges thereby defining an external exhaust passageway between the external surface and the tubular sleeve, the tubular sleeve being selectively positionable to define an unmuffled exhaust pathway and a muffled exhaust pathway along the external exhaust passageway and respectively from the first and second vents.

* * * * *